United States Patent
Nakada et al.

[11] Patent Number: 6,001,446
[45] Date of Patent: Dec. 14, 1999

[54] MAGNETIC RECORDING MEDIUM

[75] Inventors: Junji Nakada; Makoto Kashiwaya; Kunihiko Sano, all of Kanagawa, Japan

[73] Assignee: Fuji Photo Film Co., Ltd., Kanagawa, Japan

[21] Appl. No.: 08/884,266

[22] Filed: Jun. 27, 1997

[30] Foreign Application Priority Data

Jun. 27, 1996 [JP] Japan .................................. 8-167977

[51] Int. Cl.$^6$ ...................................................... G11B 5/66
[52] U.S. Cl. ........................ 428/65.3; 428/65.7; 428/336; 428/694 T; 428/694 TS; 428/694 TP; 428/694 TC; 428/694 TF; 428/900; 204/192.2
[58] Field of Search .......................... 428/694 T, 694 TS, 428/694 TP, 694 TC, 694 TF, 900, 336, 65.3, 65.7; 204/192.2

[56] References Cited

U.S. PATENT DOCUMENTS

| | | | |
|---|---|---|---|
| 5,568,533 | 10/1996 | Lal | 428/332 |
| 5,576,085 | 11/1996 | Lal | 428/65.3 |
| 5,580,667 | 12/1996 | Lal | 428/610 |
| 5,607,740 | 3/1997 | Noda | 428/65.3 |
| 5,677,033 | 10/1997 | Hamano et al. | 428/141 |
| 5,700,593 | 12/1997 | Okumura | 428/694 TS |

*Primary Examiner*—Leszek Kiliman
*Attorney, Agent, or Firm*—Sughrue, Mion, Zinn, Macpeak & Seas, PLLC

[57] ABSTRACT

A magnetic recording medium 101 constituted by a nonmagnetic support 101 made from a high polymer film having a thickness in a range of from 10 $\mu$m to 200 $\mu$m, a nonmagnetic subbing layer 102 made from a Cr alloy and formed on at least one of opposite surfaces of the nonmagnetic support 101 in the form of a film by sputtering, and a magnetic layer 103 made from a Co alloy and formed on the nonmagnetic subbing layer 102 in the form of a film by sputtering. Preferably, the magnetic recording medium 101 further has a protective layer 104 made from diamond-like carbon, and a lubricating layer 105 made from a hydrocarbon or fluorocarbon lubricant.

10 Claims, 1 Drawing Sheet

MAGNETIC RECORDING MEDIUM

BACKGROUND OF THE INVENTION

The present invention relates to a magnetic recording medium such as a magnetic tape, a magnetic disk, a magnetic card, etc., and particularly to a magnetic recording medium of a thin film type suitable for super high density recording.

Recently, with the digitalization of audio and video information, with the development and advancement in the form of multimedia, of information processing devices, and with the construction and advancement of information networks including those information processing devices, the recording media for the information processing devices have been requested to improve their performances such as recording capacity, recording/reproducing speed, cost, miniaturization, reliability, and so on.

Particularly, a magnetic disk unit is an external storage unit suitable for high density recording. As a magnetic recording medium used in such a magnetic disk unit, a coating-type magnetic recording medium in which powder of oxide magnetic substances is applied onto a support, and a thin-film-type magnetic recording medium in which a thin film of metal magnetic substances is made up on a substrate by evaporation, sputtering or the like have been known.

The thin-film-type magnetic recording medium is more suitable for higher recording density because of its higher density of a magnetic layer than that of the coating-type magnetic recording medium, so that it has often been used in hard magnetic disk drive units or portable fixed magnetic disk drive units (removable hard disk units).

As for a general structure of a hard magnetic disk which is a thin-film-type magnetic recording medium used in such a fixed magnetic disk drive unit as described above, a structure in which a subbing layer, a magnetic layer and a protective layer are formed sequentially on a substrate is well known. In order to increase the recording storage capacity of the fixed magnetic disk unit, it is necessary not only to increase the magnetic coercive force of the thin-film-type magnetic recording medium, but also to reduce the product of the residual magnetization value of the magnetic recording medium and the thickness of the magnetic layer so called Br×d in order to reduce a demagnetizing field from a bit boundary, and it is further necessary to reduce media noise.

Conventionally, an Al-Mg alloy has been often used for a substrate of the thin-film-type magnetic recording medium used in the hard magnetic disk drive unit. An NiP-plated layer is formed on the surface of the disk-like substrate and polishing is then given thereto so as to eliminate faults in the substrate surface which will cause errors in recording/reproducing. Further, an extremely minute streak pattern (groove) or moderate roughness is given to the polished substrate surface by textured finish so as to reduce a friction coefficient between the magnetic disk and a magnetic head at the time of CSS operation (Contact Start Stop), and so as to improve magnetic characteristics in the circumferential direction of the magnetic disk, particularly a magnetic coercive force Hc, a squareness ratio S, and magnetic coercive force squareness ratio S*.

In addition, in the case of the portable hard magnetic disk drive unit, the request of impact resistance of the magnetic disk is severe, and any substrates formed of glass, copper, titanium, zirconia, calcium oxide, carbon, silicon, etc. other than the AL-Mg alloy substrate, may be used.

In a manufacturing method of the thin-film-type magnetic recording medium for the hard magnetic disk, generally, a subbing film layer of Cr or the like is first formed on the substrate by sputtering process; a thin magnetic film is then formed by sputtering process as a magnetic layer such as CoCrPt, CoCrTa or the like; a protective film layer is formed by sputtering process with, for example, carbon, or by forming diamond-like carbon (DLC) by plasma CVD or the like; and, finally, a lubricating layer of fluorocarbon such as perfluoropolyether or the like is applied to thereby complete the thin-film-type magnetic recording medium.

In order to realize high recording density, on the other hand, as for a magnetic disk unit, a magneto-resistance effect type magnetic head (MR head) has been developed. As a problem of head to media interface, it is necessary to reduce distance between a recording medium and a magnetic head. In the case of a hard magnetic disk drive unit, reduction of the floating quantity of a magnetic head is tried. In this case, however, the probability that the magnetic head contacts with the magnetic disk becomes high. In the case of a floppy disk unit or the like, flexible supports such as high polymer films or the like are used, but the flatness of these supports is generally lower than that of the above-mentioned Al-Mg alloy substrate or the like, so that the frequency that the magnetic head and the magnetic disk slide on each other becomes high, and it is also considered that they always slide according to circumstances.

Further, because of the demand of a high recording storage capacity, small in the size, low in the cost and portable, a flexible thin-film-type magnetic recording medium in which a thin film of a metal magnetic substance is formed on a high polymer film having a thickness in a range of from 10 $\mu$m to 100 $\mu$m used as a support is carried out. This medium is expected to have a performance exhibiting both the characteristics such as impact resistance, portability, lightness in weight (weight of a recording medium body and a rotating mechanism), etc. possessed by a floppy disk, and the characteristics such as high recording storage density, low noise characteristic, etc possessed by a thin-film-type magnetic recording medium.

Some methods have been considered to manufacture a flexible thin-film-type magnetic recording medium using, as a support, a high polymer film made from polyethylene terephthalate (PET), polyethylene naphthalate (PEN), etc. There are, for example, a method in which such a high polymer film is punched into a disk in advance, and then, film formation is made by a disk holder type sputtering apparatus in the same manner as in the case of a conventional hard magnetic disk in a state where the disk is set in a substrate holder; and a pallet passing type sputtering method in which a plurality of substrate holders are mounted on a pallet, and passed on a sputtering target having a large area to thereby preform film formation. However, these methods have a problem on the suitability for mass production as well as a problem on the cost. Other than these methods, there is a web carriage continuous film forming method as a method which is high in productivity and advantageous in cost.

Generally, in a manufacturing method of a thin-film-type magnetic medium for a hard magnetic disk (hard disk), in order to increase the magnetic coercive force Hc and reduce the medium noise, substrate heating conditions are important in addition to the above mentioned polishing or textured-finishing of the Al-Mg alloy substrate (NiP-plated). That is, by heating the substrate, crystal grains constituting a magnetic film can be separated from each other magnetically, and the size of the crystal grains can be reduced.

In addition, the reason why a metal thin-film-type medium of a hard magnetic disk (hard disk) has a doublelayer structure of a subbing layer such as Cr or the like and a magnetic layer such as CoCrPt, CoCrTa or the like is to increase the in-plane magnetic coercive force of the Co alloy thin film. The reason can be explained as follows from the point of metal crystallographic view. A Co alloy thin film is generally apt to be a thin film having an axis of easy magnetization in the vertical direction of the film. On the other hand, if a Cr thin film is formed on a substrate and a Co alloy thin film is formed directly thereon under certain film forming conditions, Cr and Co alloy are so close in lattice constant that the Co alloy film grows up on the Cr film hetero-epitaxially. As a result, the easy-magnetization axis of the Co alloy thin film grows up with an inclination toward the direction of the substrate surface, so that a high magnetic coercive force can be generated in the surface. That is, the Cr subbing layer has a function to characterize the magnetic characteristics such as the in-plane magnetic coercive force Hc, etc. of the Co alloy thin film, and it is important to establish the film-forming conditions properly.

On the other hand, when a web-like high polymer film is used as the support as mentioned above, it is difficult to give polishing or circumferentially textured-finishing to respective disks one by one. In addition, the heating temperature is limited according to the kind of the high polymer support. Therefore, when a web-like high polymer film is used as the support to make up a flexible thin-film-type magnetic recording medium, a conventional manufacturing method of a thin-film-type magnetic recording medium for a hard magnetic disk cannot be put into practical use as it is.

The present inventors tried to make up a flexible thin-film-type magnetic recording medium by a method in which a subbing film layer such as Cr and a magnetic film layer such as CoCrPt were formed on a continuous web by sputtering process so as to form a thin magnetic film, while a high polymer film was carried as the web.

Specifically, by use of a continuous sputtering apparatus having a uncoil/coil apparatus, a high polymer film such as polyethylene terephthalate, polyethylene naphthalate or the like having a thickness in a range of from 10 $\mu$m to 200 $\mu$m was carried as a continuous web, while the web was made to be opposite to a sputtering target and carried in a space (there was no supporting mechanism on the back of the web formed by sputtering process). In such a state, a Cr subbing layer was formed in the form of a film by sputtering and, succeedingly, a CoPtCr magnetic layer was formed in the form of a film by sputtering in a similar state of the web.

However, it was found that cracks were apt to be occurred in the thin film on the high polymer film in the above-mentioned sputtering process of the subbing film. As a result, cracks were also occurred in the magnetic layer formed on the subbing layer, so that it was difficult to make up a flexible thin-film-type magnetic recording medium.

SUMMARY OF THE INVENTION

It is therefore an object of the present invention to solve the foregoing problems.

It is another object of the present invention to provide a magnetic recording medium having the characteristics of both a floppy disk and a hard disk, that is, to provide a so-called flexible thin-film-type magnetic medium which is suitable for mass production, and in which no cracks are occurred in a magnetic recording layer or the like, so that the structure is stable, and the reliability is high.

The above objects can be achieved by a magnetic recording medium comprising: a nonmagnetic support made from a high polymer film having a thickness in a range of from 10 $\mu$m to 200 $\mu$m; a nonmagnetic subbing layer made from a Cr alloy and formed on at least one of the opposite surfaces of the nonmagnetic support in a form of film by sputtering; and a magnetic layer made from a Co alloy and formed on the nonmagnetic subbing layer in a form of film by sputtering.

The above objects can be achieved by the above magnetic recording medium, wherein the nonmagnetic subbing layer made from a Cr alloy contains at least one of Ti, Mo, Si, V, Cu, W, Ta, Nb and P within a range of from 1 atomic % to 25 atomic %.

The above objects can be achieved by the above magnetic recording medium further comprising: a protective layer provided on the magnetic layer and made from at least one of diamond-like carbon, graphite-like carbon, amorphous carbon, WC, WMoC, ZrNbN, $B_4C$, $SiO_2$ and $ZrO_2$; and a lubricating layer provided on the protective layer and made from a hydrocarbon or fluorocarbon lubricant.

In the present invention, the support of the magnetic recording medium has a structure in which a magnetic recording layer is formed, by a sputtering film-forming method, on a nonmagnetic support made from a high polymer film having a thickness in a range of from 10 $\mu$m to 200 $\mu$m, so that not only a so-called flexible thin-film-type magnetic medium having the characteristics of both a floppy disk and a hard disk can be provided, but also a so-called web carriage continuously film-forming method which will be described later and which is suitable for mass production can be applied thereto.

In addition, the nonmagnetic subbing layer made from a Cr alloy contains at least one atom of Ti, Mo, Si, V, Cu, W, Ta, Nb and P, preferably at least one atom of Ti, Si, V and Ta, and more preferably at least one atom of Ti and V, so that it is possible to effectively prevent occurrence of cracks.

Further, the protective layer and the lubricating layer according to the present invention are formed on the surface of the magnetic recording layer, so that the magnetic layer is effectively prevented from being deteriorated according to conditions of use and from being damaged by the contact with a head.

In the above-mentioned case, the content of atoms contained by the nonmagnetic subbing layer is preferable in a range of from 1 atomic % to 25 atomic %, and more preferable in a range of from 2 atomic % to 8 atomic %.

This is because, first, as the content of the atoms decreases, the effect to prevent cracks is reduced, and enough effect cannot be obtained with the content less than 1 atomic %. On the contrary, when the content of atoms exceeds 25 atomic %, the magnetic characteristic such as an antimagnetic force is reduced. The mechanism of this phenomenon can be explained from the point of the above-mentioned metal crystallographic view such that the atoms contribute not to establish matching between the lattice constant of crystals of the Cr alloy layer which is growing up by sputtering process and the lattice constant of the Co alloy layer formed as a magnetic layer.

Moreover, preferably, the temperature of the continuous web when the nonmagnetic subbing layer is formed by sputtering process is not higher than the available temperature of the high polymer film.

That is, it is preferable that the temperature of the high polymer film is established so that temperature Ts of the high polymer film when the nonmagnetic subbing layer made from a Cr alloy is formed by sputtering process is equal to available temperature T1 of a well-known high polymer film.

The available temperature T1 means temperature showing heat resistance in long term use. For example, as shown in the document ("Industrial Plastic Film", edited by the Converting Technical Institute, pp.208), when a high polymer support is kept in high temperature, generally, deterioration is advanced by chemical reaction such as thermal decomposition, hydrolysis, oxidative destruction, cross linkage or the like, so that the solid state properties are reduced under threshold values. This degree is called long-term durability. In a magnetic recording medium, particularly in a process such as evaporation, sputtering or the like, in which a high polymer support is exposed to high temperature, the temperature from which this long-term durability is judged is regarded as available temperature, and as a selection reference of the support and a factor to decide the process conditions.

Specifically, for example, as disclosed in the document ("Saturated Polyester Resin Handbook", edited by the Nikkan Kogyo Shinbun Ltd., pp.736), long-term heat resistant temperature in the electrical insulating material heat resistance section of IEC85 defined from the above-mentioned point of view of heat resistance showing the life in long term use, which temperature is generally used as an index of heat resistance of plastic, is used as the available temperature. This document (pp.875) shows 155° C. in the section F in the case of PEN and 120° C. in the section E in the case of PET in a comparative diagram of PEN and PET, and this is however an example regarding the heat resistant temperature as the available temperature.

In addition, it is known that the available temperature of a high polymer film made from alamide is 180° C. and the available temperature of a high polymer film made from polyimide (PI) is 210° C.

In addition, sputtering gas used for sputtering in manufacturing the magnetic recording medium according to the present invention is selected suitably from Ar, Kr, Xe, Rn, etc., while Ar is particularly preferable.

Preferably, the magnetic recording medium according to the present invention has a general structure in which a nonmagnetic subbing layer, a magnetic layer, a protective layer and a lubricating layer are formed sequentially on at least one of the opposite surfaces of a nonmagnetic support which will be a substrate.

A flexible high polymer film made from polyethylene terephthalate, polyethylene naphthalate, polyimide, polyamide, polyamide-imide, or the like, having a thickness in a range of from 10 $\mu$m to 200 $\mu$m is preferable as the nonmagnetic support used in the magnetic recording medium in this example. Fine powder substances (filler) may be contained in the inside or surface of the support to thereby form roughness in the surface of this support. Further, a material having an inorganic undercoat layer made from silica or the like on the surface of the high polymer film may be used.

The main reason why the thickness of the nonmagnetic support is made to be in a range of from 10 $\mu$m to 200 $\mu$m is that the rigidity of the support is taken into consideration.

In the case of a support having a thickness less than 10 $\mu$m so that its rigidity is low, wrinkles are apt to be occurred in the support during sputtering process, and the portion of the wrinkles may be possibly a loss. On the contrary, in the case of a support having a thickness which exceeds 200 $\mu$m so that its rigidity is high, the flexibility of a magnetic recording medium is reduced. Accordingly, such an aim that the support can be transformed so as to cope with foreign matters bitten between a head and the magnetic recording medium is lost.

The nonmagnetic subbing layer used in the magnetic recording medium in this example is made from a Cr alloy. The Cr alloy may contain Ti, Mo, Mn, Si, V, Cu, W, Ta, Nb, P, etc. in a range of from 1 atomic % to 25 atomic %. The thickness of this subbing layer is usually in a range of from 10 nm to 200 nm, and preferably in a range of from 30 nm to 100 nm.

As mentioned above, the Cr subbing layer has a function to define the crystal structure of the Co alloy thin film layer which is a magnetic layer, but, if the thickness of the Cr subbing layer is less than 10 nm, the crystal growth of the Cr alloy layer per se is not sufficient, and cannot fulfill its function.

On the other hand, if the thickness exceeds 200 nm, the crystal growth is so excessive that there arises influence such as generation of noise, reduction of in-plane magnetic coercive force, and so on.

The magnetic layer used in the magnetic recording medium in this example is formed from a Co alloy represented by CoCr, CoNi, CoCrX, CoNiX, and so on. The Co alloy contains at least one element selected suitably from Li, Si, Ca, Yi, V, Cr, Ni, As, Y, Zr, Nb, Mo, Ru, Rh, Ag, Pt, Ta, PtTa, PtSi, PtB, TaB and so on in a range of from 0 atomic % to 30 atomic % in the form of CoCrX or CoNiX, selected preferably from Si, Cr, Ni, Pt, Ta, PtTa, PtSi and PtB, and selected more preferably from Cr, Pt and Ta.

Usually, the thickness of this magnetic layer may be selected suitably in a range of from 10 nm to 200 nm in accordance with the object and use of the magnetic recording medium. The magnetic coercive force is however conspicuously deteriorated if the thickness is less than 10 nm, and the crystal grain size is too large if the thickness exceeds 200 nm, thereby causing noise which is a problem on electromagnetic conversion characteristic.

The protective layer used in the magnetic recording medium in this example is selected suitably from diamond-like carbon, graphite-like carbon, amorphous carbon, WC, WMoC, ZrNbN, $B_4C$, $SiO_2$, $ZrO_2$, etc., while diamond-like carbon is particularly preferable. The thickness of this protective layer is selected usually to be in a range of from 2 nm to 30 nm, and preferably in a range of from 5 nm to 20 nm.

If the thickness is less than 2 nm, the film strength is so low that the layer cannot fulfill its function as the protective layer, while if the thickness exceeds 30 nm, the distance between the magnetic layer and a recording/reproducing head is so long that a so-called spacing loss is increased.

The protective later is formed by well-known CVD, PVD or the like.

The lubricating layer used in the magnetic recording medium in this example is preferably consists of, as a hydrocarbon lubricant: carboxylic acids such as stearic acid, oleic acid, etc.; esters such as butyl stearate, etc.; sulfonic acids such as octadecyl sulfonate, etc.; phosphoric esters such as monooctadecyl phosphate, etc.; alcohols such as stearic alcohol, oleic alcohol, etc.; amide carboxylates such as amide stearate, etc.; amines such as stearyl amine, etc.; or the like. As a fluorocarbon lubricant, the lubricating layer more preferably consists of a lubricant in which part of or all of alkyl groups of the above-mentioned hydrocarbon lubricant is replaced by fluoroalkyl groups or perfluoropolyether groups.

The thickness of the lubricating layer is in a range of from 0.5 nm to 4.0 nm, and more preferably in a range of from 1.0 nm to 2.0 nm.

If the thickness is less than 0.5 nm, the film strength is not enough to have a function as a lubricating layer and if the thickness exceeds 4.0 nm, there arises a problem of spacing loss similar to that in the protective layer.

The lubricating layer is formed by a well-known method of bar-type coating, dip coating, gravure coating, spray coating, spin coating, or the like.

DETAILED DESCRIPTION OF THE PREFERRED EMBODIMENT

A preferred embodiment of the present invention will be described below.

Figure 1:
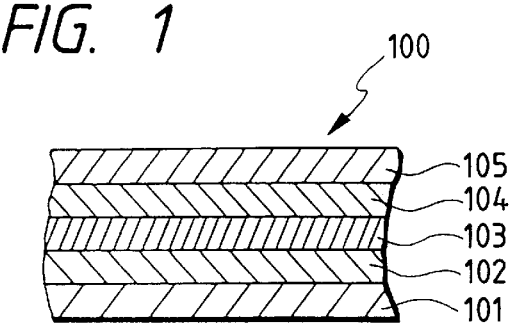
FIG. 1 is a sectional view illustrating an example of a layer structure of a magnetic recording medium according to the present invention.

FIG. 1 shows a layer structure of a magnetic recording medium 100. The magnetic recording medium 100 is constituted by a nonmagnetic support 101 made from a high polymer film having a thickness in a range of from 10 µm to 200 µm, a nonmagnetic subbing layer 102 made from a Cr alloy having a thickness in a range of from 10 nm to 200 nm, a magnetic layer 103 made from a Co alloy having a thickness in a range of from 10 nm to 200 nm, a protective layer 104 having a thickness in a range of from 2 nm to 30 nm, and a lubricating layer 105 having a thickness in a range of from 0.5 nm to 4.0 nm, those layers 102 to 105 being subsequently laminated on one of the opposite surfaces of the nonmagnetic support 101.

The nonmagnetic subbing layer 102 is formed by sputtering process of a Cr alloy onto the high polymer film while the high polymer film is being supported and carried, and the magnetic layer 103 is formed by sputtering process of a Co alloy onto the nonmagnetic subbing layer while the high polymer film is supported and carried. The protective layer 104 and the lubricating layer 105 are formed sequentially on the thus formed magnetic recording medium.

The protective layer 104 is formed by a well-known method such as CVD, PVD or the like, and the lubricating layer 105 may be formed by a well-known coating method such as bar coating, dip coating, gravure coating, spray coating, or the like, before the magnetic recording medium 100 is punched into a disk, or may be formed by a well-known coating method such as spin coating or the like after the magnetic recording medium 100 is punched into a disk.

Figure 2:
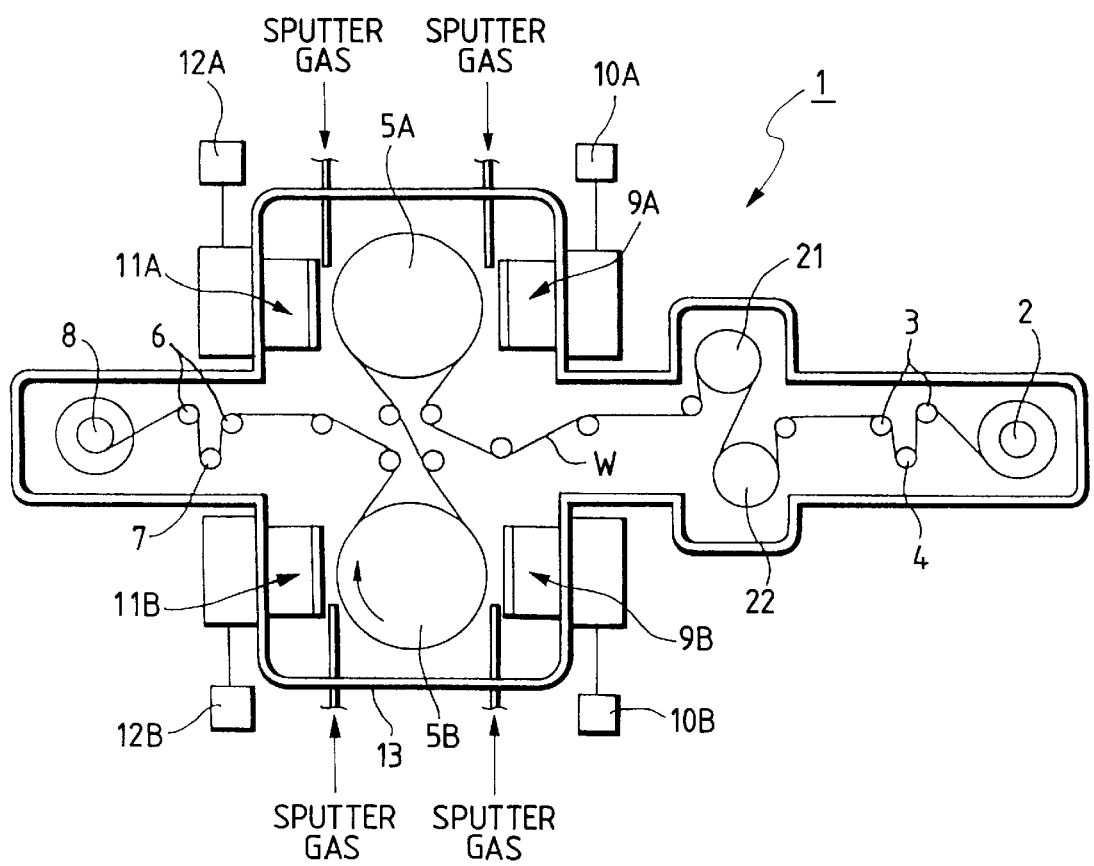
FIG. 2 is a manufacturing process diagram of an example of a continuous sputtering apparatus which can preferably manufacture a nonmagnetic layer and a magnetic layer of the layers constituting the magnetic recording medium according to the present invention.

FIG. 2 shows an example of a continuous sputtering apparatus 1 which can preferably manufacture the nonmagnetic layer and the magnetic layer of the magnetic recording medium 100 according to the present invention, and which can perform sputtering process on one or both of the opposite surfaces of the nonmagnetic support made from a high polymer film. The continuous sputtering apparatus 1 has a uncoil shaft, a coil shaft, and a main drum supporting a continuous web and facing a sputtering target. The continuous sputtering apparatus 1 is disposed in a sputtering chamber 13 which can be evacuated to $1.0 \times 10^{-5}$ Torr or less by a vacuum pump (not shown), and to which sputter gas is introduced through a mass-flow controller (not shown) so that the sputtering pressure can be established desirably within a range of from $6 \times 10^{-4}$ to $1 \times 10^{-2}$ Torr.

As shown in FIG. 2, in the continuous sputtering apparatus 1, a continuous web W, as the nonmagnetic support, made from a high polymer film (PET, PEN or the like) having a thickness in a range of from 10 µm to 200 µm is delivered from an uncoil (delivery) shaft 2, passed through a plurality of delivery-side free rollers 3 and delivery-side dancer rolls 4, and carried to two main drums, that is, to a main drum (for film formation on the front surface) 5A and a main drum (for film formation on the back surface) 5B through a pair of heating drums 21 and 22. Further, being supported and carried along the main drums 5A and 5B, the continuous web W is wound up on a coil shaft 8 through a plurality of coil-side free rollers 6 and coil-side dancer rolls 7. The tension of the continuous web W when it is carried is kept constant by the delivery-side dancer rolls 4 and the coil-side dancer rolls 7.

The tension of the continuous web W is selected desirably within a range of from 1 kgf/m to 50 kgf/m though it depends on film forming conditions and so on.

The delivery shaft 2, the main drums 5A and 5B, and the coil shaft 8 are driven and rotated by driving means (not shown), respectively.

A jacket type drum using steam or the like, an induction heating type drum, or the like, is selected suitably as the heating drums 21 and 22 and the main drums 5A and 5B, and the surface temperature of the heating drums and the main drums can be adjusted to any desired temperature in a range of from 25° C. to 280° C. by temperature control.

A first sputtering target 9A for performing sputtering to form a nonmagnetic subbing layer from a Cr alloy on the front surface of the continuous web W in a state of being put along the main drum 5A is disposed in a position opposite to the main drum 5A on the delivery side (in the upper right side in the drawing). A DC sputtering power supply 10A is connected to this first sputtering target 9A, and sputtering power is applied from the DC sputtering power supply 10A to the first sputtering target 9A so as to form a nonmagnetic subbing layer from a Cr alloy on the front surface of the continuous web W by sputtering process.

A second sputtering target 11A for performing sputtering to form a magnetic layer from a Co alloy on the front surface of the continuous web W in the state of being put along the main drum 5A is disposed in a position opposite to the main drum 5A on the coil side (in the upper left side in the drawing). A DC sputtering power supply 12A is connected to this second sputtering target 11A, and sputtering power is applied from the DC sputtering power supply 12A to the second sputtering target 11A so as to further form a magnetic layer from a Co alloy on the nonmagnetic subbing layer formed on the front surface of the continuous web W by sputtering process.

A first sputtering target 9B for performing sputtering to form a nonmagnetic subbing layer from a Cr alloy on the back surface of the continuous web W in the state of being put along the main drum 5B is disposed in a position opposite to the main drum 5B on the delivery side (in the lower right side in the drawing). A DC sputtering power supply 10B is connected to this first sputtering target 9B, and sputtering power is applied from the DC sputtering power supply 10B to the first sputtering target 9B so as to form a nonmagnetic subbing layer from a Cr alloy on the back surface of the continuous web W by sputtering process.

A second sputtering target 11B for performing sputtering to form a magnetic layer from a Co alloy on the back surface of the continuous web W in the state of being put along the main drum 5B is disposed in a position opposite to the main drum 5A on the coil side (in the lower left side in the drawing). A DC sputtering power supply 12A is connected to this second sputtering target 11B, and sputtering power is applied from the DC sputtering power supply 12B to the second sputtering target 11B so as to further form a magnetic layer from a Co alloy on the nonmagnetic subbing layer formed on the back surface of the continuous web W by sputtering process.

The sputtering pressure in the sputtering chamber is set suitably in a range of from $6 \times 10^{-4}$ to $1 \times 10^{-2}$ Torr by introducing sputter gas (such as Ar gas) through a mass-flow controller (not shown). This is because it is difficult to keep stable glow discharge of these sputtering cathodes if the sputtering pressure is not higher than the lower limit $6 \times 10^{-4}$ Torr. On the other hand, the reason why the upper limit $1 \times 10^{-2}$ Torr of the sputtering pressure exists is that it is difficult to obtain sputtering pressure higher than this upper limit because of various factors of apparatus in a gas introduction system and a vacuum pumping system.

Next, the operation of the above-mentioned embodiment will be described.

First, the continuous web W made from a high polymer film having a thickness in a range of from 10 $\mu$m to 200 $\mu$m is uncoiled/delivered from the uncoil (delivery) shaft 2, passed through a plurality of the delivery-side free rollers 3 and delivery-side dancer rolls 4, and carried to the main drum 5A through a pair of the heating drums 21 and 22. The continuous web W carried to the main drum 5A is carried to the front of the first sputtering target 9A while it is heated, supported and carried by the main drum 5A, so that a nonmagnetic subbing layer made from a Cr alloy is formed on the surface of the continuous web W by sputtering process (Step 1). Further, the continuous web W carrying the nonmagnetic subbing layer made from a Cr alloy by sputtering process is carried to the front of the second sputtering target 11A while it is supported and carried by the main drum 5A, so that a magnetic layer made from a Co alloy is formed on the nonmagnetic subbing layer by sputtering process (Step 2). Further, being supported and carried by the main drum 5A, the continuous web W having the magnetic layer made from a Co alloy thereon by sputtering process is carried to the main drum 5B. The continuous web W carried to the main drum 5B is carried to the front of the first sputtering target 9B while being heated, supported and carried by the main drum 5B, so that a nonmagnetic subbing layer made from a Cr alloy is formed on the back surface of the continuous web W by sputtering process (Step 3). Further, the continuous web W provided with the nonmagnetic subbing layer made from a Cr alloy by sputtering process is carried to the front of the second sputtering target 11B while being supported and carried by the main drum 5B, so that a magnetic layer made from a Co alloy is formed on the nonmagnetic subbing layer by sputtering process (Step 4). Further, after being supported and carried by the main drum 5B, the continuous web W provided with the magnetic layer made from a Co alloy by sputtering process is passed through a plurality of the coil-side free rollers 6 and coil-side dancer rolls 7, and wound up by the coil shaft 8.

A step of forming a protective layer and a lubricating layer sequentially may be added after sputtering process of a magnetic layer in accordance with the use of a magnetic recording medium to be manufactured.

In addition, although the step of sputtering process of a Cr alloy and the step of sputtering process of a Co alloy are performed continuously in the above embodiment, these steps may be performed not continuously but separately. Further, although sputtering process on the front and back surfaces of the web W is performed continuously in the above embodiment, sputtering process on the front and back surfaces may be performed not continuously but separately.

EXAMPLES

Examples of the present invention will be described below.

In the examples of the present invention, as to main drums, the diameter was 600 mm, the material was SUS304, the surface was finished by hard electroplated chrome finish 0.8S, and the heating structure was an induction heating system which could control temperature. A vacuum pump system was constituted by a plurality of rotary pumps (not shown), mechanical booster pumps, and cryopumps. As a sputtering film-forming system, a sputtering target made from a $Cr_{90}Mo_{10}$ alloy was disposed in a position opposite to the main drum on the upstream side in the carriage direction of the continuous web W, and a Co alloy sputtering target was disposed in a position opposite to the main drum on the downstream side. The shortest distance between the main drum and the sputtering target was made to be 100 mm, and the size of each sputtering target was made to be 140 mm wide, 400 mm long, and 4 mm thick. Ar was used as the sputtering gas, and as for an introduction system of the gas, a system was employed such that the gas was supplied to the circumference of the sputtering targets through a mass-flow controller (not shown).

The continuous sputtering apparatus was evacuated to be not higher than $1.0 \times 10^{-5}$ Torr by use of the respective vacuum pumps in the state where the raw fabric of the high polymer film was set on the delivery shaft.

The following experiments were performed in the stage where these preparations were ready.

Experiment 1

A high polymer film, as a substrate, was made from polyethylene terephthalate so as to be 310 mm wide, 500 m long and 75 $\mu$m thick. The high polymer film was delivered in the conditions of the carrying speed of 1 m/min and the tension of 6 kgf/width, and sputter power of 10 kW was applied from a DC sputtering power supply to a cathode of a $Cr_{90}Mo_{10}$ alloy sputtering target.

The main drum temperature was set to 55° C., and the sputtering pressure was made to be $2 \times 10^{-3}$ Torr. A $Cr_{90}Mo_{10}$ subbing layer 100 nm thick was formed under these film-forming conditions.

The state of generation of cracks in the $Cr_{90}Mo_{10}$ subbing layer formed on the high polymer film was observed mainly by using an optical microscope.

As a result, it could be confirmed that the $Cr_{90}Mo_{10}$ subbing layer was formed with no cracks.

In the same manner, succeedingly after the $Cr_{90}Mo_{10}$ subbing layer was formed, a $Co_{68}Cr_{20}Pt_{12}$ sputtering target was used, and sputtering power of 3 kW was applied to a cathode thereof from a DC sputtering power supply to thereby continuously form a $Co_{68}Cr_{20}Pt_{12}$ layer having a thickness of 30 nm on the $Cr_{90}Mo_{10}$ subbing layer. Then, the two-layered film of the $Cr_{90}Mo_{10}$ layer and the Co-alloy layer was observed by using an optical microscope. As a result, it was confirmed that the two-layered film without any cracks could be formed stably in the same manner as the observation result of the film of the $Cr_{90}Mo_{10}$ single layer.

Further, experiments were performed in the same manner as in Experiment 1 while various changes were made in the combination of the range of the sputtering power applied voltage from 1 to 20 kW, the range of the main drum temperature from 25 to 115° C., and the range of the sputtering pressure from $6\times10^{-4}$ Torr to $8\times10^{-3}$ Torr. As a result, it was confirmed that the good two-layered film without any cracks could be formed when the thickness of the $Cr_{90}Mo_{10}$ subbing layer was in a range of from 10 to 200 nm.

Experiment 2

Experiments were performed by using a $Cr_{80}Ti_{20}$ alloy as the Cr alloy sputtering target, and using a high polymer film made from polyethylene terephthalate which was 310 mm wide, 500 m long and 90 $\mu$m thick.

A $Cr_{80}Ti_{20}$ subbing layer 100 nm thick was formed under the conditions that the temperature of the main drum was set to 80° C., and the other experiment conditions were made the same as those in Experiment 1.

The state of generation of cracks in this $Cr_{80}Ti_{20}$ subbing layer was observed by using an optical microscope in the same manner as in Experiment 1.

As a result, it could be confirmed that the $Cr_{80}Ti_{20}$ subbing layer was formed with no cracks.

In the same manner, succeedingly after the $Cr_{80}Ti_{20}$ subbing layer was formed, a $Co_{68}Cr_{20}Pt_{12}$ sputtering target was used, and sputtering power of 3 kW was applied to a cathode thereof from a DC sputtering power supply to thereby continuously form a $Co_{68}Cr_{20}Pt_{12}$ layer having a thickness of 30 nm on the $Cr_{80}Ti_{20}$ subbing layer. Then, the two-layered film of the $Cr_{80}Ti_{20}$ layer and Co-alloy layer was observed by using an optical microscope. As a result, it was confirmed that the two-layered film without any cracks could be formed stably in the same manner as the observation result of the film of the $Cr_{80}Ti_{20}$ single layer.

Further, experiments were performed in the same manner as in the Experiment 2 while various changes were made in the combination of the range of the sputtering power applied voltage from 1 to 20 kW, the range of the main drum temperature from 25 to 150° C., and the range of the sputtering pressure from $6\times10^{-4}$ Torr to $8\times10^{-3}$ Torr. As a result, it was confirmed that the good two-layered film without any cracks could be formed when the thickness of the $Cr_{80}Ti_{20}$ subbing layer was in a range of from 10 to 200 nm.

Experiment 3

Experiments were performed by using $Cr_{95}V_5$ as the Cr-alloy sputtering target, and using a high polymer film made from polyimide which was 310 mm wide, 500 m long and 60 $\mu$m thick.

A $Cr_{95}V_5$ subbing layer 100 nm thick was formed under the conditions that the temperature of the main drum was set to 110° C., and the other experiment conditions were made similar to those in Experiment 1.

The state of generation of cracks in this $Cr_{95}V_5$ subbing layer was observed by using an optical microscope in the same manner as in Experiments 1 and 2.

As a result, it could be confirmed that the $Cr_{95}V_5$ subbing layer was formed with no cracks.

In the same manner, succeedingly after the $Cr_{95}V_5$ subbing layer was formed, a $Co_{68}Cr_{20}Pt_{12}$ sputtering target was used, and sputtering power of 3 kW was applied to a cathode thereof from a DC sputtering power supply to thereby continuously form a $Co_{68}Cr_{20}Pt_{12}$ layer having a thickness of 30 nm on the $Cr_{95}V_5$ subbing layer. Then, the two-layered film of the $Cr_{95}V_5$ layer and the Co-alloy layer was observed by using an optical microscope. As a result, it was confirmed that the two-layered film without any cracks could be formed stably in the same manner as the observation result of the film of the $Cr_{95}V_5$ single layer.

Further, experiments were performed in the same manner as in Experiment 3 while various changes were made in the combination of the range of the sputtering power applied voltage from 1 to 20 kW, the range of the main drum temperature from 25 to 200° C., and the range of the sputtering pressure from $6\times10^{-4}$ Torr to $8\times10^{-3}$ Torr. As a result, it was confirmed that the good two-layered film without any cracks could be formed when the thickness of the $Cr_{95}V_5$ subbing layer was in a range of from 10 to 200 nm.

Although Cr alloys containing Mo, Ti and V in a range of from 1 atomic % to 25 atomic % in addition to Cr were shown in the above three experiments, similar effects could be obtained even if Mn, Si, Cu, W, Ta, Nb and P were used in replace of Mo, Ti and V.

Further, in a magnetic recording medium where no cracks were occurred, a protective layer and a lubrication layer were formed by the following method.

A protective layer was made from a diamond-like carbon film so as to have a thickness of 5 nm by sputtering process in CH4-Ar gas atmosphere under the condition of gas pressure of 20 mTorr. A lubricating layer was formed from a lubricant (fonfline Z-DOL), in which an OH group was introduced to the end of perfluoropolyether, so as to have a thickness of 1.0 nm by a spin coating method.

These forming conditions and method may be selected desirably in accordance with required performance, quality and so on, and, not to say, formation of the lubricating layer and the protective layer according to the present invention is not limited to these forming conditions and method.

A magnetic recording medium according to the present invention has the following effects.

A support of the magnetic recording medium is made to be a nonmagnetic support made from a high polymer film having a thickness in a range of from 10 $\mu$m to 200 $\mu$m, and a magnetic layer is formed on one or both of the opposite surfaces of the nonmagnetic support by sputtering process, so that a so-called flexible thin-film-type magnetic recording medium having, in combination, the characteristics of a floppy disk such as impact resistance, portability, lightness in weight (weight of a recording medium body and a rotating mechanism), etc., and the characteristics of a hard disk such as high recording density, low noise characteristic, etc. can be provided.

Because the support of the magnetic recording medium is made from a high polymer film having a thickness in a range of from 10 $\mu$m to 200 $\mu$m, a so-called web carriage continuously film-forming method can be used so as to be suitable for mass production.

Further, at least one atom of Ti, Mo, Si, V, Cu, W, Ta, Nb and P is contained in a nonmagnetic subbing layer made from a Cr alloy in a range of from 1 atomic % to 25 atomic %, so that it is possible to prevent cracks from being occurred.

Further, a protective layer made from at least one of diamond-like carbon, graphite-like carbon, amorphous carbon, WC, WMoC, ZrN, bN, $B_4C$, $SiO_2$ and $ZrO_2$ on the magnetic layer made from a Co alloy, and a lubricating layer made from a hydrocarbon or fluorocarbon lubricant on the protective layer are laminated, so that the magnetic layer or the like is effectively prevented from being deteriorated according to use environments and from being damaged by the contact with a head, etc.

What is claimed is:

1. A magnetic recording medium comprising:
   a continuous web shaped nonmagnetic support made from a polymer film having a thickness in a range of from 10 μm to 200 μm;
   a nonmagnetic subbing layer made from a Cr alloy and formed on at least one of opposite surfaces of said nonmagnetic support in a form of film by sputtering; and
   a magnetic layer made from a Co alloy and formed on said nonmagnetic subbing layer in a form of film by sputtering,
   wherein the medium is produced by a process comprising continuously conveying the support made from a polymer film through a continuous sputtering apparatus.

2. The magnetic recording medium according to claim 1, wherein said nonmagnetic subbing layer made from a Cr alloy contains at least one of Ti, Mo, Si, V, Cu, W, Ta, Nb and P within a range of from 1 atomic % to 25 atomic %.

3. The magnetic recording medium according to claim 1, further comprising:
   a protective layer provided on said magnetic layer and made from at least one of diamond-like carbon, graphite-like carbon, amorphous carbon, WC, WMoC, ZrNbN, $B_4C$, $SiO_2$ and $ZrO_2$; and
   a lubricating layer provided on said protective layer and made from a hydrocarbon or fluorocarbon lubricant.

4. The magnetic recording medium according to claim 2, further comprising:
   a protective layer provided on said magnetic layer and made from at least one of diamond-like carbon, graphite-like carbon, amorphous carbon, WC, WMoC, ZrNbN, $B_4C$, $SiO_2$ and $ZrO_2$; and
   a lubricating layer provided on said protective layer and made from a hydrocarbon or fluorocarbon lubricant.

5. The magnetic recording medium according to claim 1, wherein the polymer film has an available temperature, and a continuous web temperature of not higher than the available temperature of the polymer film is used when the nonmagnetic subbing layer is formed.

6. The magnetic recording medium according to claim 5, wherein when the nonmagnetic subbing layer is formed, the polymer film has a temperature which is equal to the available temperature.

7. The magnetic recording medium according to claim 1, wherein the medium is a floppy disk which is made by stamping/pressing the continuous web-shaped nonmagnetic support together with the nonmagnetic subbing layer and the magnetic layer formed thereon.

8. The magnetic recording medium according to claim 1, wherein the medium is a hard disk which is made by stamping/pressing the continuous web-shaped nonmagnetic support together with the nonmagnetic subbing layer and the magnetic layer formed thereon.

9. The magnetic recording medium according to claim 1, wherein within a chamber, the continuous web-shaped nonmagnetic support is wound on a delivery shaft in the form of a roll shape and then is drawn-out from the chamber, and then the continuous web-shaped nonmagnetic support is wound upon a coil shaft after being subjected to treatment.

10. The magnetic recording medium according to claim 1, wherein the polymer film is a film made of polyethylene terephthalate or polyethylene naphthalate.

* * * * *